(12) United States Patent
Lu et al.

(10) Patent No.: US 9,471,224 B2
(45) Date of Patent: *Oct. 18, 2016

(54) STORAGE MANAGEMENT SYSTEM, MANAGEMENT DEVICE AND METHOD THEREFOR

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Xin Lu, Shenzhen (CN); Huan-Huan Zhang, Shenzhen (CN); Yu-Yong Zhang, Shenzhen (CN); Yao-Hua Liu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 19 days.

This patent is subject to a terminal disclaimer.

(21) Appl. No.: 14/677,495

(22) Filed: Apr. 2, 2015

(65) Prior Publication Data
US 2016/0132247 A1    May 12, 2016

(30) Foreign Application Priority Data

Nov. 12, 2014 (CN) .......................... 2014 1 0633863

(51) Int. Cl.
*G06F 3/00* (2006.01)
*G06F 3/06* (2006.01)

(52) U.S. Cl.
CPC ........... *G06F 3/0604* (2013.01); *G06F 3/0638* (2013.01); *G06F 3/0685* (2013.01); *G06F 3/0689* (2013.01)

(58) Field of Classification Search
None
See application file for complete search history.

(56) References Cited

U.S. PATENT DOCUMENTS

| 2004/0236897 A1* | 11/2004 | Cheng | G06F 3/0608 711/103 |
| 2010/0228931 A1* | 9/2010 | Mikami | G06F 3/0625 711/154 |
| 2014/0164699 A1* | 6/2014 | Resch | G06F 12/023 711/114 |

* cited by examiner

*Primary Examiner* — David X Yi
*Assistant Examiner* — Craig Goldschmidt
(74) *Attorney, Agent, or Firm* — Zhigang Ma

(57) ABSTRACT

A storage management method includes the following steps: detecting sizes of shared storage spaces of terminal devices joined in a sharing system; classifying the terminal devices joined in a sharing system to a number of kinds of terminal devices according to a size of the shared storage space of each terminal device; mapping the shared storage spaces of each kind of terminal devices of each device group to virtual disks with corresponding storage capacities of a virtual disk array card one by one; receiving a storing request to store a file to a cloud, and determining a size of the file to be stored and selecting one virtual disk whose storage capacity is nearest and greater than or equal to the size of the file, and storing the file to the shared storage spaces of the terminal devices mapping to the selected virtual disk.

15 Claims, 4 Drawing Sheets

STORAGE MANAGEMENT SYSTEM, MANAGEMENT DEVICE AND METHOD THEREFOR

CROSS-REFERENCE TO RELATED APPLICATION

This application claims priority to Chinese Patent Application No. 201410633863.2 filed on Nov. 12, 2014, the contents of which are incorporated by reference herein.

FIELD

The subject matter herein generally relates to management systems, and particularly to a storage management system, a storage management device, and a storage management method.

BACKGROUND

Nowadays, portable devices, such as mobile phones, tablet computers are popular devices. When a user regularly uses one portable device, the storage capacity of the portable device cannot satisfy the storing requirement of the regularly input data.

BRIEF DESCRIPTION OF THE DRAWINGS

Implementations of the present technology will now be described, by way of example only, with reference to the attached figures.

DETAILED DESCRIPTION

Figure 1:
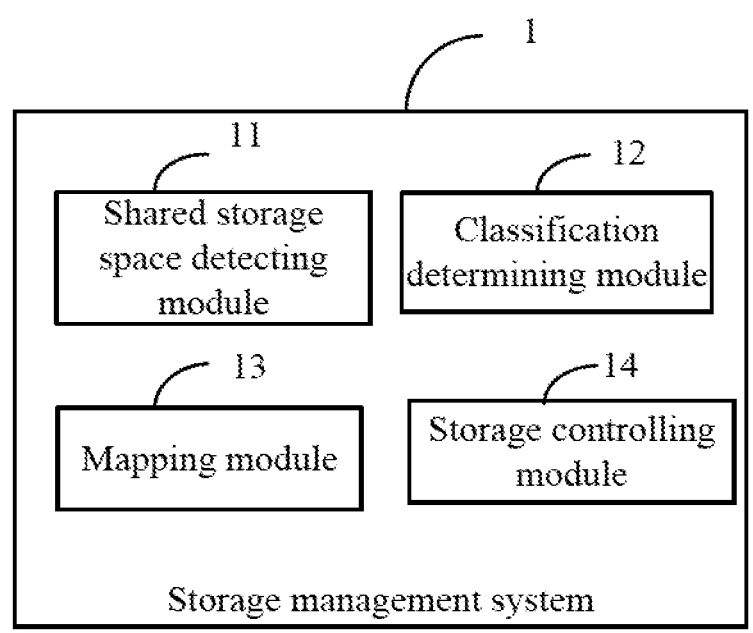
FIG. 1 is a block diagram of a storage management system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented. The term "module" refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series and the like. The connection can be such that the objects are permanently connected or releasably connected.

Figure 2:
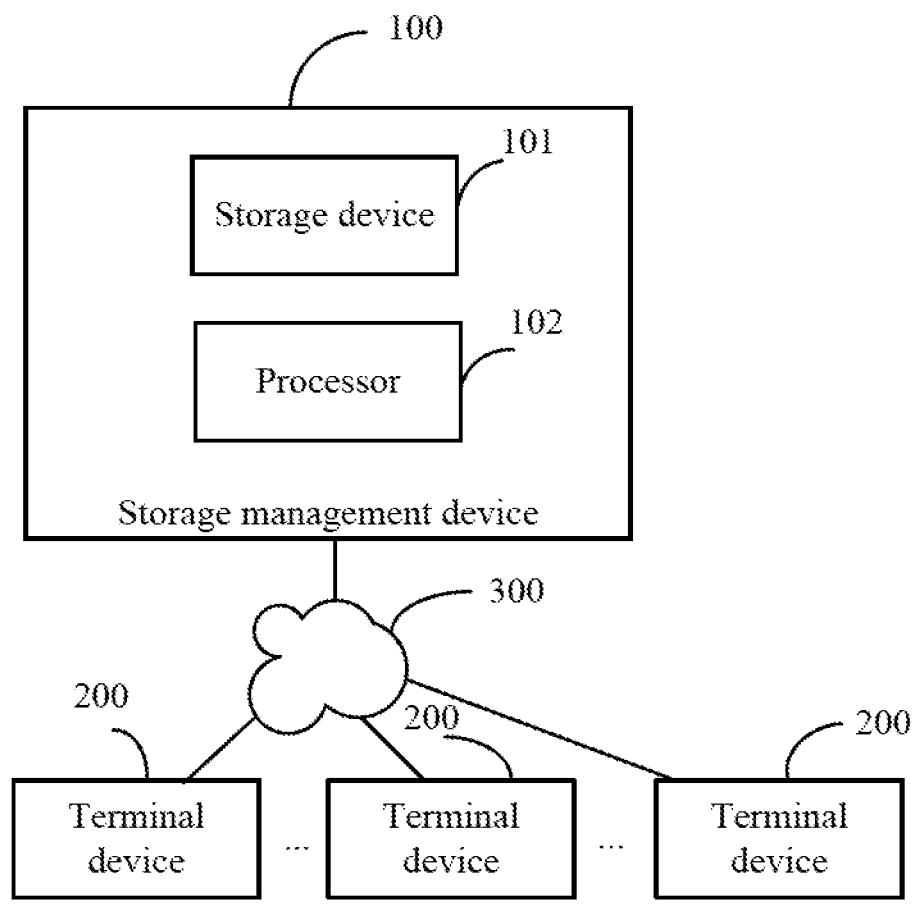
FIG. 2 is a block diagram of a storage management device and a number of terminal devices connected to the storage management device.

FIGS. 1 and 2 illustrate a storage management system 1 (shown in FIG. 1). The storage management system 1 is installed in a storage management device 100 as shown in FIG. 2 and is run by the storage management device 100. The storage management device 100 is connected to a number of terminal devices 200 via the network 300 by wired mode or wireless mode.

The storage management device 100 includes a storage device 101 and a processor 102. The terminal devices 200 can be tablet computers, mobile phones, workstation computers, or personal computers including desktop computers and portable computers. The storage management device 100 can be a server or a server group. The network 300 can be Internet, a wireless network including WIFI® and BLU-ETOOTH®, a telecommunication network including a general packet radio service (GPRS) network and a code division multiple access (CDMA) network, or a broadcasting network.

Figure 3:
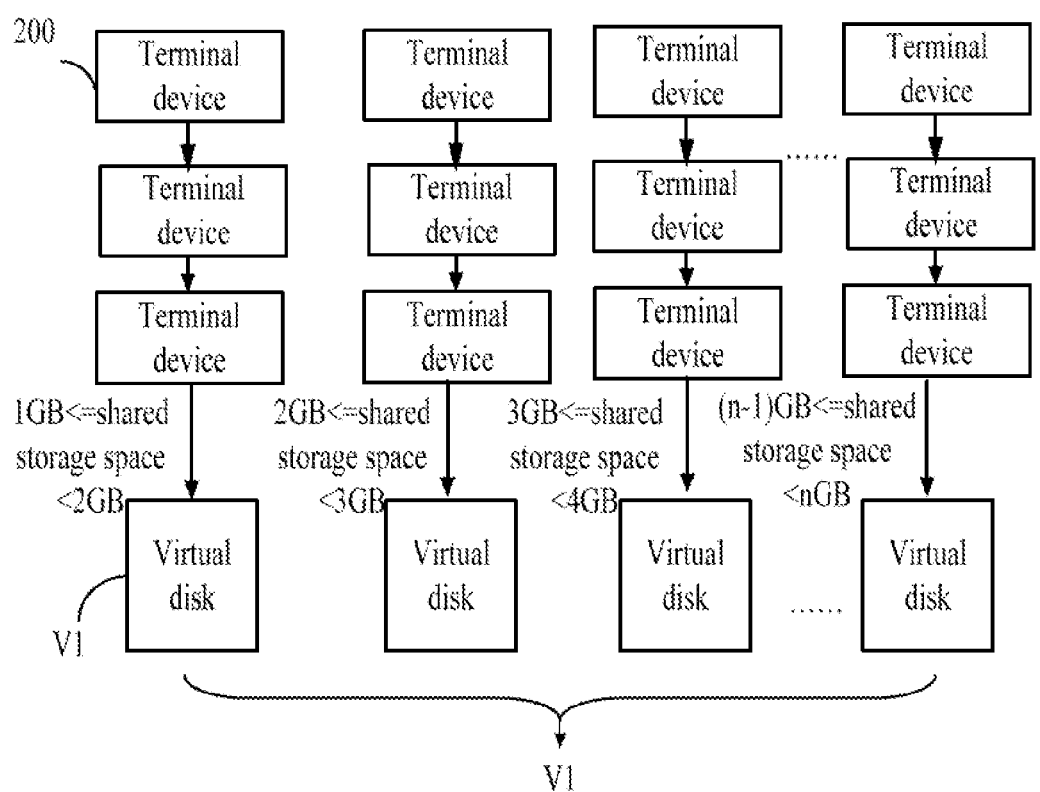
FIG. 3 is a diagram showing mapping relationships between a virtual disk array card and a number of terminal devices.

FIG. 3 illustrates the storage device 101 stores a virtual disk array card V1, the virtual disk array card V1 includes a number of virtual disks D1 with different storage capacities. In the embodiment, the number of virtual disks D1 are arranged in a line, and the virtual disk array card V1 includes a virtual disk D1 with 1 GB (GB), a virtual disk D1 with 2 GB, a virtual disk D1 with 3 GB, and the like.

The storage management system 1 can map shared storage spaces of the number of terminal devices 200 to the virtual disk array card V1, and can store a large size file to other terminal devices with the shared storage spaces in response to a storing request to store the large size file to cloud from one terminal device.

FIG. 1 illustrates the storage management system 1 includes a shared storage space detecting module 11, a classification determining module 12, a mapping module 13, and a storage controlling module 14. The modules of the storage management system 1 can be a collection of software instructions stored in the storage device 101 and executed by the processor 102, or can include functionality represented as hardware or integrated circuits, or as software and hardware combinations, such as a special-purpose processor or a general-purpose processor with special-purpose firmware.

In at least one embodiment, the processor 102 can be a central processing unit, a digital signal processor, or a single chip, for example. In at least one embodiment, the storage device 101 can be an internal storage system, such as a flash memory, a random access memory (RAM) for temporary storage of information, and/or a read-only memory (ROM) for permanent storage of information. The storage device 101 can also be a storage system, such as a hard disk, a storage card, or a data storage medium. The storage device 101 can include volatile and/or non-volatile storage devices. In at least one embodiment, the storage device 101 can include two or more storage devices such that one storage device is a memory and the other storage device is a hard drive. Additionally, one or more of the storage devices 101 can be located either entirely or partially external relative to the storage management device 100.

The shared storage space detecting module 11 is used to detect sizes of the shared storage spaces of the terminal devices 200 joined in a sharing system. In the embodiment, the terminal devices 200 joined in the sharing system are the terminal devices 200 registering in the storage management device 100 and providing the shared storage spaces. The shared storage space detecting module 11 detects the sizes of the shared storage space of one terminal device 200 after the terminal device 200 has registered in the storage management device 100, and detects the size of shared storage space of the terminal device 200 in real time when the terminal device 200 connects to the storage management device 100.

In one embodiment, the shared storage space of each terminal device 200 can be an idle storage space of the terminal device 200. In another embodiment, the shared storage space of each terminal device 200 can be a storage space predefined by a user of the terminal device 200. For example, if the idle storage space of the terminal device 200 is 10 GB, the user of the terminal device 200 can define 5 GB as the shared storage space and thus other terminal devices 200 can store data to the 5 GB shared storage space. The registered terminal devices 200 can connect to the storage management device 100 via the network 300, thus providing the shared storage space for other terminal devices 200 joined in the sharing system, and can store files to cloud, that is, the registered terminal devices 200 can store files to shared storage spaces of other terminal devices 200 joined in the sharing system.

The classification determining module 12 is used to classify the terminal devices joined in the sharing system to different kinds of terminal devices 200 according to the size of the shared storage space of each terminal device 200 joined in the sharing system. Each kind of terminal devices 200 have a corresponding storage capacity. For example, the classification determining module 12 classifies the terminal devices 200 whose sizes of the shared storage spaces are greater than or equal to 1 GB and less than 2 GB as a first kind of terminal device 200 with 1 GB storage capacity, and classifies the terminal devices 200 whose shared storage spaces are greater than or equal to 2 GB and less than 3 GB as a second kind of terminal device 200 with 2 GB storage capacity, and classifies the terminal devices 200 whose shared storage spaces are greater than or equal to 3 GB and less than 4 GB as a third kind of terminal device 200 with 3 GB storage capacity, etc. In the embodiment, the classification determining module 12 reclassifies the terminal device 200 when the size of the shared storage space of the terminal device 200 is changed. In the embodiment, a difference between two adjacent kinds of terminal devices 200 is 1 GB, in other embodiments, the difference between two adjacent kinds of terminal devices 200 can be 0.5 GB, 2 GB, 3 GB, and the like.

FIG. 3 illustrates the mapping module 13 is used to map the shared storage spaces of different kind of terminal devices 200 to virtual disks D1 with corresponding storage capacities of the virtual disk array card V1 one by one. That is, each kind of terminal devices 200 is mapped to one corresponding virtual disk D1 with corresponding storage capacity. In detail, the mapping module 13 links the shared storage spaces of each kind of terminal devices 200 to form a number of corresponding storage space chains, and respectively maps the storage space chains to the virtual disks D1 with the corresponding storage capacities of the virtual disk array card V1. For example, the mapping module 13 links the shared storage spaces of the terminal devices 200, which are classified as the first kind of terminal device 200 with 1 GB storage capacity, to form a storage space chain, and maps the storage space chain to the virtual disk D1 with 1 GB storage capacity of the virtual disk array card V1. The mapping module 13 then links the shared storage spaces of the terminal devices 200, which are classified as the second kind of terminal device 200 with 2 GB storage capacity, to form another storage space chain, and maps the storage space chain to the virtual disk D1 with 2 GB storage capacity of the virtual disk array card V1, until the shared storage spaces of all kinds of terminal devices 200 are mapped to the corresponding virtual disks D1 of the virtual disk array card V1.

In another embodiment, the mapping module 13 does not link the shared storage spaces of each kind of terminal device 200 to form the storage space chain and directly maps the shared storage spaces of one kind of terminal devices 200 to the corresponding virtual disk D1 of the corresponding row of the virtual disk array card V1.

In one embodiment, the mapping module 13 is further used to pre-establish the virtual disk array card V1 in response to user operation and store the virtual disk array card V1 to the storage device 101. The virtual disk D1 of the virtual disk array card V1 are in a format of redundant array of inexpensive disks and are arranged in one line. In another embodiment, the virtual disk D1 of the virtual disk array card V1 can be arranged in a multi-row and multi-column matrix pattern.

The storage controlling module 14 is used to receive a storing request to store a file to cloud from one terminal device 200, and determine a size of the file to be stored (hereinafter the file) according to the storing request, and randomly select one virtual disk D1 whose storage capacity is nearest and greater than or equal to the size of the file to be stored from the virtual disk array card V1, and store the file to the shared storage spaces of the terminal devices 200 mapping to the selected virtual disk D1, namely the kind of the terminal devices mapping to the selected virtual disk D1.

For example, assuming the size of the file to be stored is 1.8 GB, thus the virtual disk D1 whose storage capacity is nearest and greater or equal to the size of the file is the virtual disk D1 with 2 GB, the storage controlling module 14 selects the virtual disk D1 with 2 GB from the virtual disk array card V1, and stores the file to the shared storage space of the terminal devices 200 mapping to the selected virtual disk D1 with 2 GB.

In the embodiment, the storing request can be generated and transmitted to the storage management device 100 in response to an operation of selecting a corresponding menu item when the user needs to store one file to cloud, and the storing request includes size information of the file to be stored.

In one embodiment, when the mapping module 13 maps the shared storage space of one terminal device 200 to one virtual disk D1, the mapping module 13 associates an communication address (such as an internet protocol address, a hardware address) of the terminal device 200 with the virtual disk D1, and store the communication address of the terminal device 200 to the storage device 101. The storage controlling module 14 stores the file to the shared storage spaces of the terminal devices 200 mapping to the selected virtual disk D1 as follows: the storage controlling module 14 determines the communication addresses of the terminal devices 200 mapping to the selected virtual disk D1, and stores the file to the shared storage spaces of the terminal devices 200 according to the communication addresses of the terminal devices 200.

Therefore, according to the present disclosure, the user of one terminal device 200 can store files to other terminal devices 200. Because the files are stored to a number of terminal devices 200, the file is available to be accessed when needed from anyone of the at least one terminal device 200 connected to the storage management device 100.

Figure 4:
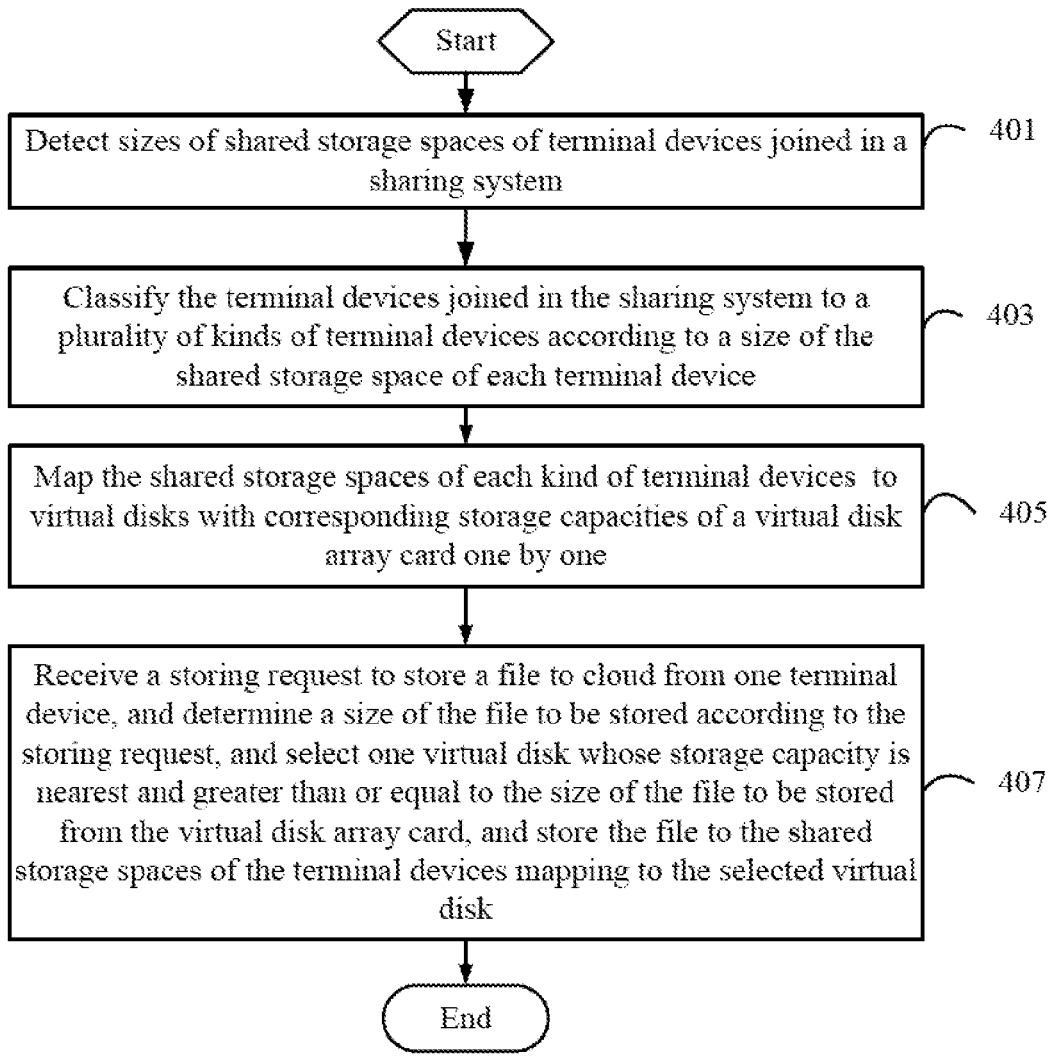
FIG. 4 is a flowchart illustrating a storage management method.

FIG. 4 illustrates a flowchart of a storage management method. The method is provided by way of example, as there are a variety of ways to carry out the method. The method described below can be carried out using the configurations illustrated in FIG. 1, for example, and various elements of these figures are referenced in explaining the example method. Each block shown in FIG. 4 represent one or more processes, methods, or subroutines carried out in the example method. Additionally, the illustrated order of blocks is by example only and the order of the blocks can be changed. The example method can begin at block 401.

At block 401, a shared storage space detecting module detects sizes of shared storage spaces of terminal devices joined in a sharing system. In the embodiment, the terminal devices joined in the sharing system are the terminal devices registered in a storage management device and providing the shared storage spaces. The shared storage space detecting module detects the sizes of the shared storage space of one terminal device after the terminal device has registered in the storage management device, and detects the shared storage space of the terminal device in real time when the terminal device connects to the storage management device 100.

At block 403, a classification determining module classifies the terminal devices joined in the sharing system to a number of kinds of terminal devices according to a size of the shared storage space of each terminal device joined in the sharing system, each kind of terminal devices have a corresponding storage capacity.

At block 405, a mapping module maps the shared storage spaces of different kinds of terminal devices to virtual disks with corresponding storage capacities of the virtual disk array card one by one. In detail, the mapping module links the shared storage spaces of different kind of terminal devices to form a number of corresponding storage space chains, and respectively maps the storage space chains to the virtual disks with the corresponding storage capacities of the virtual disk array card.

At block 407, a storage controlling module receives a storing request to store a file to the cloud, and determines a size of the file to be stored according to the storing request, and selects one virtual disk whose storage capacity is nearest and greater than or equal to the size of the file to be stored from the virtual disk array card, and stores the file to the shared storage spaces of the terminal devices mapping to the selected virtual disk.

In one embodiment, the method further includes steps: the mapping module further pre-establishes the virtual disk array card in response to user operation and stores the virtual disk array card to the storage device, the virtual disk D1 of the virtual disk array card V1 are in a format of redundant array of inexpensive disks.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A storage management system comprising:
at least one processor; and
a plurality of modules which are collections of instructions executable by the at least one processor, the modules comprising:
a cloud storage comprising a plurality of terminal devices joined in a sharing system, wherein each terminal device comprises storage, and each terminal device designates a portion of its respective storage as a shared storage space for the sharing system;
a shared storage space detecting module configured to, upon execution by the at least one processor, cause the at least one processor to detect sizes of the shared storage spaces of the plurality of terminal devices;
a classification determining module configured to, upon execution by the at least one processor, cause the at least one processor to perform the following:
create a plurality of kinds of terminal device, wherein each kind of terminal device has a different respective shared storage size range;
classify each terminal device into one of the plurality of kinds of terminal device so that the shared storage size of the respective terminal device is within the shared storage size range of the respective kind of terminal device;
for each respective kind of terminal device, link the corresponding terminal devices to form a respective storage space chain;
a mapping module configured to, upon execution by the at least one processor, cause the at least one processor to map each respective storage space chain to a respective one of a plurality of virtual disks in a virtual disk array card, wherein the respective virtual disk has a size equal to the respective storage space chain;
a storage controlling module configured to, upon execution by the at least one processor, cause the at least one processor to receive a storing request to store a file to the cloud storage from one terminal device, and determine a size of the file to be stored according to the storing request, and select one virtual disk from the virtual disk array card whose storage capacity is nearest and greater than or equal to the size of the file to be stored, and store the file to the shared storage spaces of the terminal devices mapping to the selected virtual disk.

2. The system according to claim 1, wherein the terminal devices joined in the sharing system are registered in a storage management device; wherein the shared storage space detecting module detects the shared storage space of one terminal device after the terminal device has registered in the storage management device.

3. The system according to claim 2, wherein the shared storage space of each terminal device is an idle storage space of the terminal device or a storage space predefined by a user of the terminal device.

4. The system according to claim 2, wherein the mapping module is further configured to, upon execution by the at least one processor, cause the at least one processor to pre-establish the virtual disk array card in response to user operation and the virtual disks of the virtual disk array card are in a format of redundant array of inexpensive disks.

5. The system according to claim 2, wherein the storing request is generated in response to an operation of selecting a corresponding menu item of the terminal device, wherein the storing request comprises size information of the file to be stored.

6. A storage management device comprising:
a storage device storing a virtual disk array card, wherein, the virtual disk array card comprises a plurality of virtual disks with different storage capacities; and
at least one processor configured to execute the plurality of modules, the plurality of modules comprising:
a cloud storage comprising a plurality of terminal devices joined in a shared system, wherein each terminal device comprises storage, and each terminal device designates a portion of its respective storage as a shared storage space for the sharing system;
a shared storage space detecting module configured to, upon execution of the at least one processor, cause the at least one processor to detect sizes of the shared storage spaces of terminal devices;
a classification determining module configured to, upon execution by the at least one processor, cause the at least one processor to perform the following:
create a plurality of kinds of terminal device, wherein each kind of terminal device has a different respective shared storage size range;
classify each terminal device into one of the plurality of kinds of terminal device so that the shared storage size of the respective terminal device is within the shared storage size range of the respective kind of terminal device;
for each respective kind of terminal device, link the corresponding terminal devices to form a respective storage space chain;
a mapping module configured to, upon execution by the at least one processor, cause the at least one processor to map each respective storage space chain to a respective one of a plurality of virtual disks in a virtual disk array card, wherein the respective virtual disk has a size equal to the respective storage space chain;
a storage controlling module configured to, upon execution by the at least one processor, cause the at least one processor to receive a storing request to store a file to the cloud storage from one terminal device, and determine a size of the file to be stored according to the storing request, and select one virtual disk from the virtual disk array card whose storage capacity is nearest and greater than or equal to the size of the file to be stored, and store the file to the shared storage spaces of the terminal devices mapping to the selected virtual disk.

7. The device according to claim 6, wherein the terminal devices joined in the sharing system are registered in a storage management device; wherein the shared storage space detecting module detects the shared storage space of one terminal device after the terminal device has registered in the storage management device.

8. The device according to claim 7, wherein the shared storage space of each terminal device is an idle storage space of the terminal device or a storage space predefined by a user of the terminal device.

9. The device according to claim 7, wherein the mapping module is further configured to pre-establish the virtual disk array card in response to user operation and the virtual disks of the virtual disk array card are in a format of redundant array of inexpensive disks.

10. The device according to claim 7, wherein the storing request is generated in response to an operation of selecting a corresponding menu item of the terminal device, wherein the storing request comprises size information of the file to be stored.

11. A storage management method, applied in a storage management device, comprising:
creating a cloud storage comprising a plurality of terminal devices joined in a sharing system, wherein each terminal device comprises storage, and each terminal device designates a portion of its respective storage as a shared storage space for the sharing system;
detecting sizes of the shared storage spaces of terminal devices;
creating a plurality of kinds of terminal device, wherein each kind of terminal device has a different respective shared storage size range;
classifying each terminal device into one of the plurality of kinds of terminal device so that the shared storage size of the respective terminal device is within the shared storage size range of the respective kind terminal device;
for each respective kind of terminal device, linking the corresponding terminal devices to form a respective storage space chain;
mapping each respective storage space chain to a respective one of a plurality of virtual disks in a virtual disk array card, wherein the respective virtual disk has a size equal to the respective storage space chain;
receiving a storing request to store a file to the cloud storage from one terminal device, and selecting one virtual disk whose storage capacity is nearest and greater than or equal to the size of the file to be stored, and storing the file to the shared storage spaces of the terminal devices mapping to the selected virtual disk.

12. The method according to claim 11, wherein the terminal devices joined in the sharing system are registered in a storage management device, wherein the step of detecting sizes of shared storage spaces of terminal devices joined in a sharing system comprises: detecting the sizes of the shared storage space of the terminal devices after the terminal devices have registered in the storage management device.

13. The method according to claim 12, wherein the shared storage space of each terminal device is an idle storage space of the terminal device or a storage space predefined by a user of the terminal device.

14. The method according to claim 12, further comprising:
pre-establishing the virtual disk array card in response to user operation, wherein the virtual disks of the virtual disk array card are in a format of redundant array of inexpensive disks.

15. The method according to claim 12, further comprising:
generating the storing request in response to an operation of selecting a corresponding menu item of the terminal device, the storing request comprising size information of the file to be stored.

* * * * *